US009429166B2

(12) United States Patent
Inada et al.

(10) Patent No.: US 9,429,166 B2
(45) Date of Patent: Aug. 30, 2016

(54) SEALING STRUCTURE, VACUUM PUMP MOTOR INCLUDING SAME SEALING STRUCTURE, AND VACUUM PUMP

(71) Applicant: EBARA CORPORATION, Tokyo (JP)

(72) Inventors: Takanori Inada, Tokyo (JP); Naoya Yoshida, Tokyo (JP); Takashi Hozumi, Tokyo (JP); Yoshinori Ojima, Tokyo (JP); Toshiharu Nakazawa, Tokyo (JP)

(73) Assignee: EBARA CORPORATION, Tokyo (JP)

( * ) Notice: Subject to any disclaimer, the term of this patent is extended or adjusted under 35 U.S.C. 154(b) by 122 days.

(21) Appl. No.: 13/960,283

(22) Filed: Aug. 6, 2013

(65) Prior Publication Data

US 2014/0050605 A1 Feb. 20, 2014

(30) Foreign Application Priority Data

Aug. 16, 2012 (JP) .................................. 2012-180481

(51) Int. Cl.
| F04D 29/08 | (2006.01) |
| F04C 29/00 | (2006.01) |
| F04C 15/00 | (2006.01) |
| H02K 5/12 | (2006.01) |
| H02K 5/22 | (2006.01) |

(52) U.S. Cl.
CPC ............. *F04D 29/08* (2013.01); *F04C 15/008* (2013.01); *F04C 29/0085* (2013.01); *H02K 5/12* (2013.01); *H02K 5/225* (2013.01)

(58) Field of Classification Search
CPC ......... H02K 5/225; H02K 5/12; F04D 29/08
USPC ....................................................... 174/17.08
See application file for complete search history.

(56) References Cited

U.S. PATENT DOCUMENTS

| 2,469,099 | A | * | 5/1949 | Andrus | ..................... | H02K 3/38 |
| | | | | | | 174/114 R |
| 4,451,750 | A | * | 5/1984 | Heuer et al. | ..................... | 310/88 |
| 4,626,721 | A | * | 12/1986 | Ouchi | ............................ | 310/71 |
| 6,538,350 | B2 | * | 3/2003 | Martin | ............................ | 310/43 |
| 2011/0035933 | A1 | * | 2/2011 | Jang | ......................... | H02K 3/50 |
| | | | | | | 29/596 |

FOREIGN PATENT DOCUMENTS

| EP | 0 733 804 A2 | 9/1996 |
| EP | 1 075 074 A2 | 2/2001 |
| FR | 1.473.304 | 2/1966 |
| JP | S55-117447 A | 9/1980 |
| JP | S56-078343 A | 6/1981 |
| JP | S59106864 A | 6/1984 |
| JP | 2005-210837 A | 8/2005 |
| JP | 4435556 B | 1/2010 |
| JP | 4435556 B2 | 1/2010 |
| WO | 2005/043691 A1 | 5/2005 |

OTHER PUBLICATIONS

Extended European Search Report issued in Application No. 13020077.7 dated Nov. 27, 2013.

* cited by examiner

*Primary Examiner* — William H Mayo, III
*Assistant Examiner* — Hiram E Gonzalez
(74) *Attorney, Agent, or Firm* — Pearne & Gordon LLP

(57) ABSTRACT

A sealing structure for a vacuum pump motor which maintains the sealing properties of the vacuum pump motor in an ensured fashion, including a lead wire which is passed through an opening portion formed in a motor frame to be connected to a motor stator and a seal member which seals the opening portion. The lead wire includes a core wire portion and a covering portion which covers the core wire portion. The lead wire also includes a seal portion formed around at least part of the core wire portion inside the covering portion.

7 Claims, 5 Drawing Sheets (A)

(B)

(A)

(B)

SEALING STRUCTURE, VACUUM PUMP MOTOR INCLUDING SAME SEALING STRUCTURE, AND VACUUM PUMP

FIELD OF INVENTION

The present invention relates to a sealing structure and more particularly to a seal mechanism of a motor used for a vacuum pump. In addition, the present invention relates to a motor including the sealing structure and a vacuum pump including the motor.

BACKGROUND ART

Vacuum pumps are used in, for example, semiconductor fabrication systems. A motor is attached to a vacuum pump as a drive source. In a structure in which a main shaft of the vacuum pump is connected directly to the motor and no shaft sealing portion is provided, a sealing structure needs to be provided on the motor to maintain a vacuum. In this case, a motor stator is disposed within the motor, and electric power supply lead wires are connected to this motor stator. Because of this, the lead wires also need to be provided with a certain structure to maintain a vacuum. In this regard, a motor is disclosed in which a motor stator and a connecting portion with lead wires are sealed in altogether by a resin (refer to Patent Literature 1).

In addition, there is also proposed a motor in which a can is installed between a motor stator and a motor rotor to realize a sealing structure (refer to Patent Literature 2). Further, there is also disclosed a motor in which a sealing structure is imparted to a motor frame. In this case, a sealing structure needs to be provided in an opening portion through which lead wires are passed, and a part called a hermetic terminal is used.

CITATION LIST

Patent Literature

[Patent Literature 1] Japanese Patent Public Disclosure No. SHO 59-106864

[Patent Literature 2] Japanese Patent No. 4435556

SUMMARY OF INVENTION

In the conventional sealing structures, however, the following problems are caused. Namely, the motor rotor is connected directly to the main shaft of the vacuum pump, and a rotor main shaft lies under a vacuum (or partial vacuum) condition. Therefore, the motor rotor is also exposed to the vacuum condition similarly. Because of this, the vacuum condition also needs to be maintained in the space where the motor rotor is accommodated. In order to fulfill the requirement, for example, as described above, the motor stator is sealed in by a resin to maintain the vacuum condition. However, in order to seal in the motor stator by the resin, complex forming molds need to be prepared to execute an injection molding operation, which becomes very complex and troublesome. In addition, when an inner circumference of a stator core is exposed to a motor rotor compartment as in Patent Literature 1, in the event that a gap is produced in the interface with the resin or a hermetic creepage is produced in the motor lead wires, the vacuum cannot be maintained.

Even in the case of a vacuum being maintained not by using the resin sealing approach but by providing a can, it is considered that the can itself is damaged or broken. When the can is damaged or broken, the vacuum is lost. For example, in a semiconductor process pump, a momentary loss of vacuum (or entry of air) possibly causes a problem of a reaction of a process gas and air or an external discharge of the process gas. Further, when a vacuum is maintained by using a hermetic terminal in an opening from which lead wires are led out, the production costs are increased very much, making this approach disadvantageous in cost.

The invention has been made in view of the problems described above. According to the invention, there is provided a sealing structure for a vacuum pump motor, including a lead wire which passes through an opening portion formed in a motor frame to be connected to a motor stator and a seal member which seals the opening portion, wherein the lead wire includes a core wire portion and a covering portion which covers the core wire portion, and a seal portion is formed in at least part of the core wire portion.

In addition, according to the invention, there is provided a sealing structure for a vacuum pump motor, including a lead wire which is connected to a motor stator and a resin molded portion which seals a connecting portion where the lead wire is connected to the motor stator with a resin, wherein the lead wire includes a core wire portion and a covering portion which covers the core wire portion, and a seal portion is formed in at least part of the core wire portion, and wherein at least part of the resin molded portion doubles as an attaching portion to a vacuum pump.

Additionally, according to either of the sealing structures of the invention, the seal portion is a portion where a sealing treatment is imparted in which the core wire portion in an interior of the covering portion is impregnated with a resin.

Additionally, according to either of the sealing structures of the invention, the seal portion is a portion where a sealing treatment is imparted in which part of the covering portion is removed to integrate core wires into a single wire assembly through soldering, and further, the seal portion is covered by a heat-shrinkable tube via a sealing medium.

In addition, according to the sealing structure of the invention, the seal member is made of an elastic rubber and a drilled hole through which the lead wire is passed is formed in the seal member.

Additionally, according to the sealing structure of the invention, the elastic rubber is attached to the opening portion in the motor frame while being compressed by a predetermined fastening plate.

In addition, according to the invention, there is provided a vacuum pump motor with the sealing structure which includes a motor rotor which is connected directly to a pump main shaft of a vacuum pump.

Additionally, according to the vacuum pump motor of the invention, a can which closes securely the motor rotor is provided between the motor stator and the motor rotor.

In addition, according to the invention, there is provided a vacuum pump including the sealing structure or the motor.

According to the invention, a can or a hermetic terminal can be avoided due to the lead wires and the motor frame being provided with their own sealing structure. In addition, the double sealing structure can be realized inexpensively which still maintains the vacuum condition even in the event that the can is damaged in the motor with the can.

BRIEF DESCRIPTION OF DRAWINGS

FIG. 2 shows sectional views of motors, of which FIG. 2(A) shows a motor without a can, and FIG. 2(B) shows a motor with a can.

FIG. 4 shows sectional views illustrating lead wire sealing structures, of which FIG. 4(A) shows a sealing structure employing a resin sealing, and FIG. 4(B) shows a sealing structure employing soldering.

DESCRIPTION OF EMBODIMENTS

Next, an embodiment of the invention will be described based on the accompanying drawings.

Figure 1:
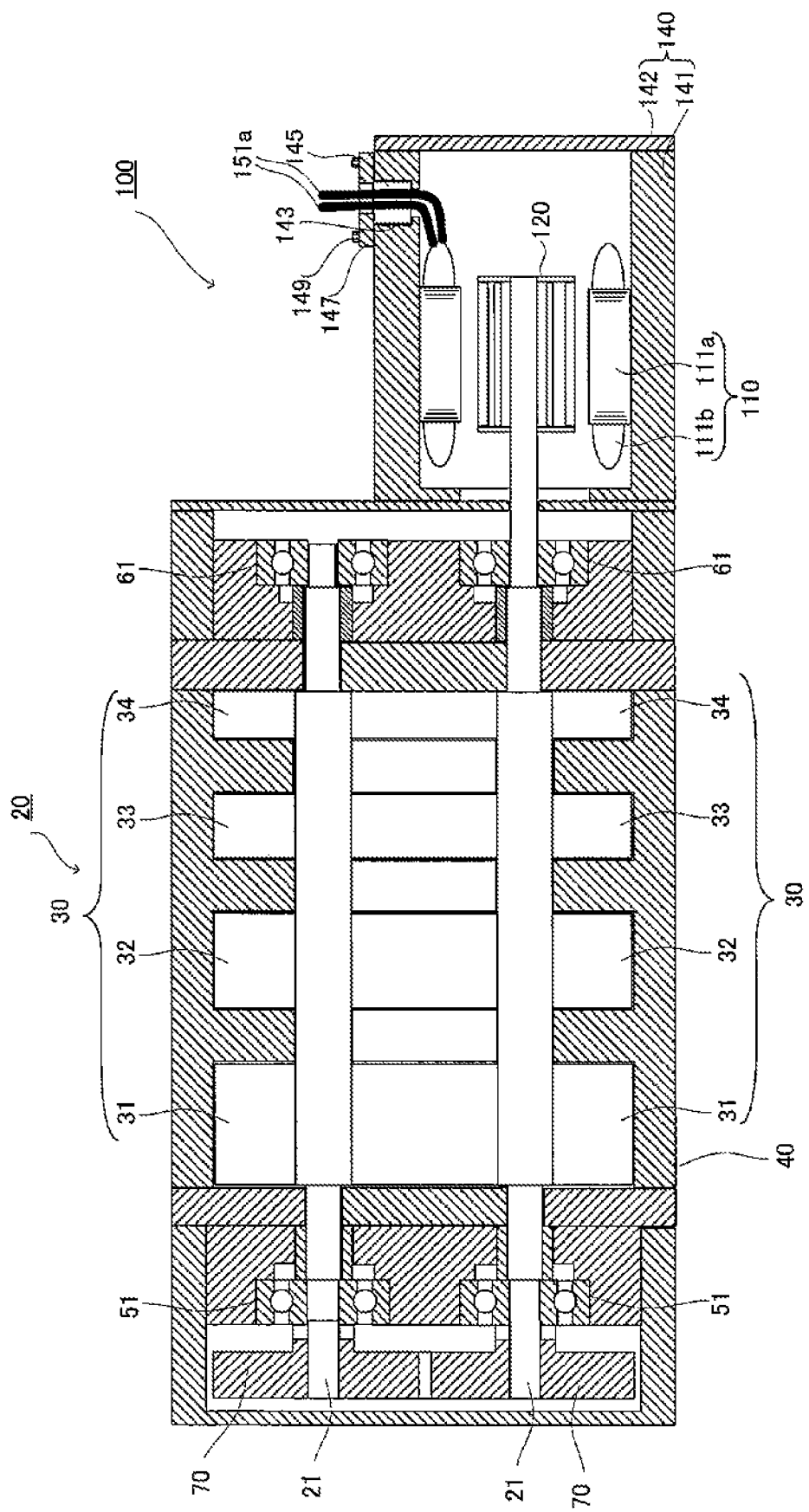
FIG. 1 is a sectional view showing a vacuum pump and a motor which includes a sealing structure according to an embodiment of the invention.

FIG. 1 shows an overall schematic sectional view of a motor 100 including a sealing structure according to an embodiment of the invention and a vacuum pump 20 to which the motor 100 is attached. In FIG. 1, a section is shown which includes axes of two pump main shafts 21 of the vacuum pump 20. As shown in the figure, the vacuum pump 20 includes a pair of rotors 30. In this embodiment, the rotors 30 each include a first-stage rotor 31, a second-stage rotor 32, a third-stage rotor 33 and a fourth-stage rotor 34. The pump main shafts 21 which support these rotors 30 are supported by bearings 51, 61 in positions lying near both end portions thereof. Additionally, the rotors 30 are accommodated in a casing 40.

The rotors 30 are driven by the motor 100 which is provided at one end side of the pump main shaft 21 of the vacuum pump 20. A pair of timing gears 70, which mesh with each other, are fixed to the other ends of the pump main shaft 21. In this configuration, two of the pump main shafts 21 and the rotors 30 rotate in opposite directions to each other at the same speed. It is noted that FIG. 1 shows a simplified configuration of the motor 100.

When the motor 100 is driven, the rotors 30 rotate in the opposite directions without any contact with a slight gap held with an inner surface of the casing 40 and between the rotors 30. As the pair of rotors 30 rotate, a gas at a suction side is confined between the rotors 30 and the casing 40 and is then conveyed to a discharge side. A gas introduced from an intake port (whose illustration is omitted) is compressed and conveyed to a discharge port (whose illustration is omitted) by the fourth-stage rotors 34 to thereby be discharged from the discharge port.

Figure 2:
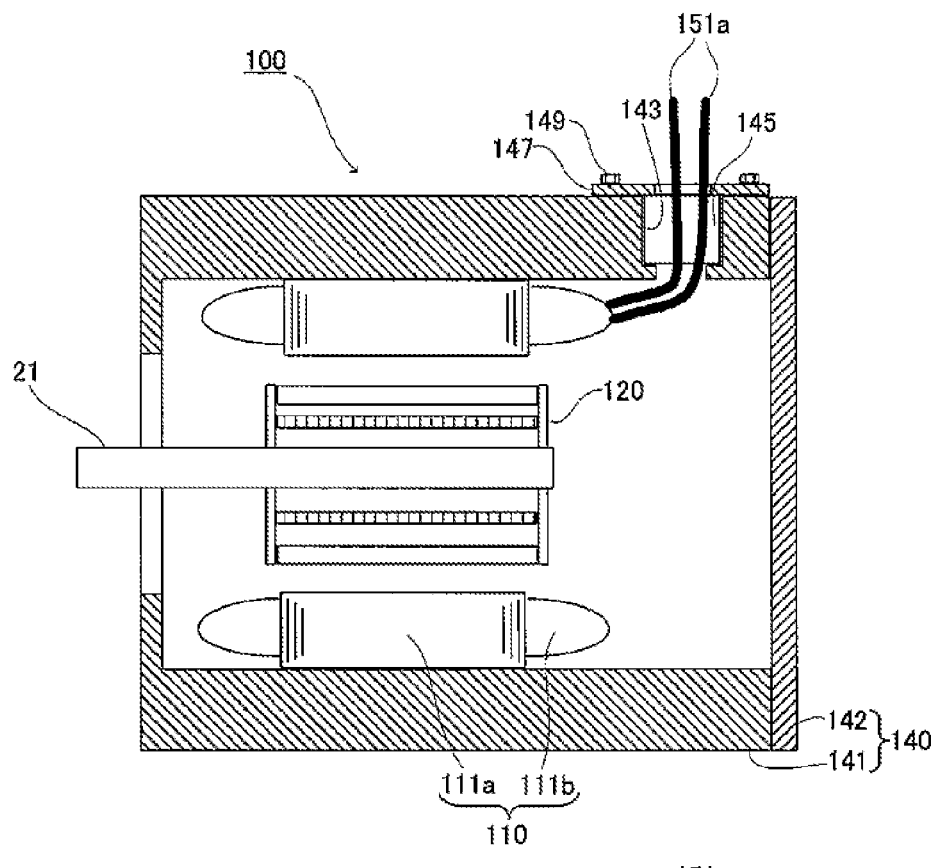
Figure 2:
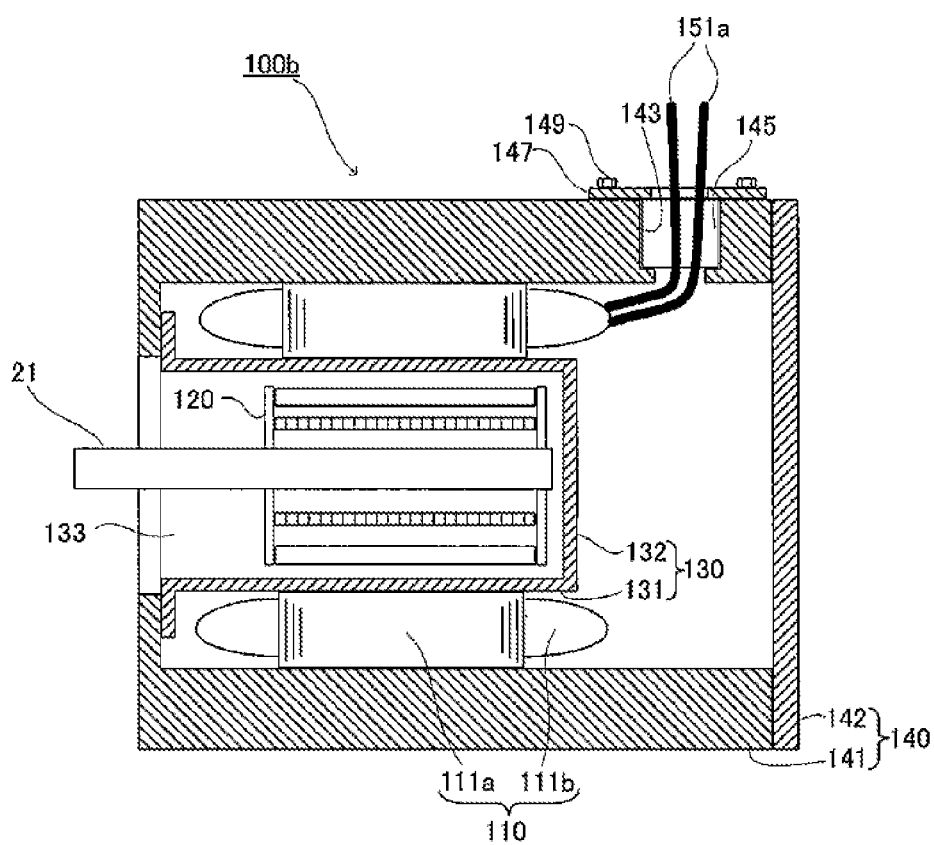

FIG. 2(A) is a sectional view showing a schematic configuration of the motor 100 which drives to rotate the rotors of the vacuum pump. As shown in FIG. 2, the motor 100 includes a motor stator 110, a motor rotor 120 and a motor frame 140. The motor frame 140 includes a frame main body 141 and an end plate 142. The frame main body 141 has a cylindrical shape and an interior space is formed along the axes of the pump main shafts 21 in the frame main body 141. The end plate 142 is attached to the frame main body 141 with bolts (whose illustration is omitted). The motor frame 140 can be formed of, for example, iron or aluminum. The motor stator 110 and the motor rotor 120 are accommodated in the interior space in the motor frame 140.

In the motor stator 110, a coil 111b is installed on a stator core 111a. Specifically, in the motor stator 110, the coil 111b protrudes outwards of the stator core 111a at both ends in an axial direction of the pump main shaft 21. The motor stator 110 is fixed to the motor frame 140 concentrically with the axis of the pump main shaft 21 by the stator core 111a being fitted in an interior of the frame main body 141 of the motor frame 140. The stator core 111a can be formed, for example, by laminating silicon steel plates one on another. The motor rotor 120 is disposed concentrically with the axis of the pump main shaft 21 in an interior of the motor stator 110 and is connected directly to the pump main shaft 21 of the vacuum pump 100.

[Modified Examples of Motors]

FIG. 2B shows a modified example of a motor. In a motor 100b according to this modified example, a can 130 is provided between a motor stator 110 and a motor rotor 120. The can 130 isolates the motor stator 110 from the motor rotor 120. This can 130 includes a body portion 131, a closed portion 132 and an opening portion 133. The body portion 131 has a substantially cylindrical shape and is disposed concentrically with an axis of the can 130.

The closed portion 132 constitutes one end face of the can 130 and an interior space of the body portion 131 is closed by one end portion of the body portion 131. The opening end portion 133 constitutes the other end portion and forms an opening of the can 130. A flange-shaped portion is provided on an outer circumferential portion of the opening portion 133, and this flange-shaped portion is formed larger than an outside diameter of the body portion 131.

The can 130 is formed from resin, and the body portion 131, the closed portion 132 and the flange-shaped portion are formed integrally. In this modified example, PPS (polyphenylene sulfide) resin is used as a material for the can 130. It is desirable that the thickness of the body portion 131 is as small as possible from the viewpoint of enhancement in motor efficiency.

The can 130 is mounted so that a stator core 111a and the body portion 131 are brought into abutment with each other in a circumferential direction. Further, the stator core 111a and the body portion 131 are bonded together at the abutment portion with an adhesive. In this way, the stator core 111a and the body portion 131 are formed integrally as a result of the stator core 111a and the body portion 131 being bonded together with the adhesive. Because of this, the stator core 111a can reinforce the mechanical strength of a portion of the body portion 131 which corresponds to the stator core 111a. This enables the portion of the body portion 131 which corresponds to the stator core 111a to be formed thin. In consideration of heat resistant properties of the adhesive when the vacuum pump 20 is in operation, such an adhesive as a silicon-based or epoxy-based adhesive can be used. It is noted that the can 130 may be placed in a position which is spaced away from the motor stator 110.

Figure 3:
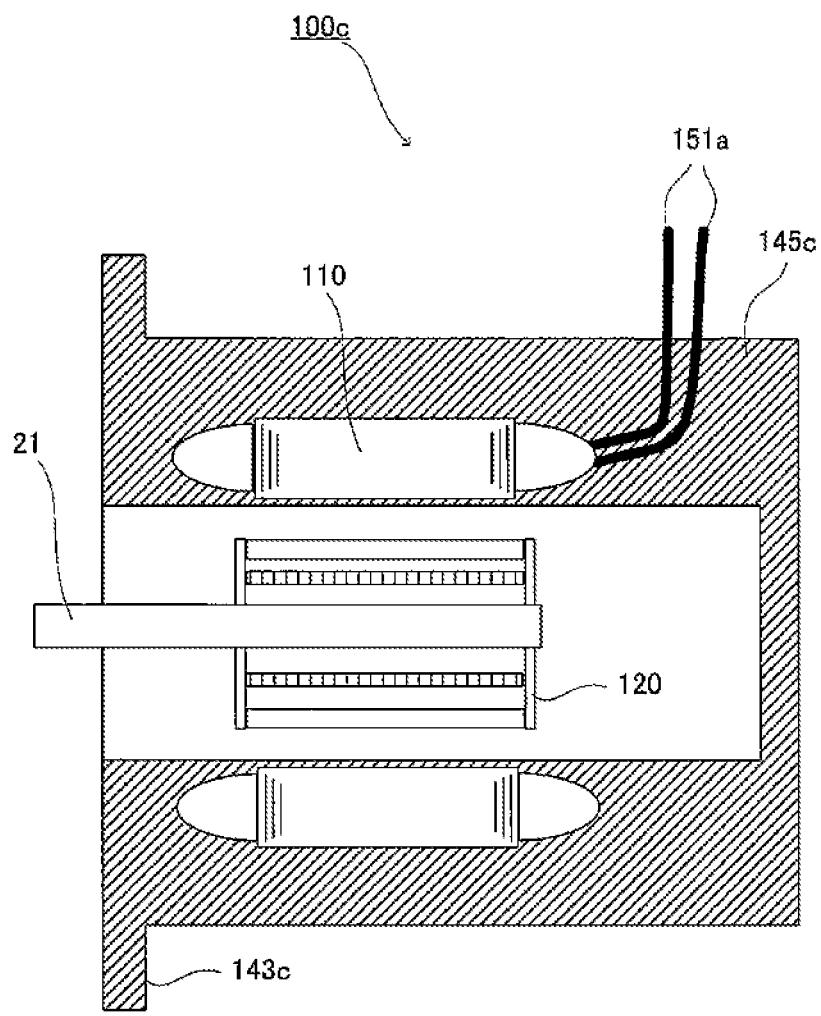
FIG. 3 is a sectional view showing a motor in which a motor stator is sealed in a resin by a resin molded portion.

FIG. 3 is a sectional view showing a modified example of a motor in which a motor stator 110 is resin sealed by a resin molded portion 145c. In this motor 100c, a motor frame is omitted, and the resin molded portion 145c substantially functions as a motor frame. Namely, the motor stator 110 and a connecting portion where lead wires 151a are connected to the motor stator 110 are resin sealed completely by the resin molded portion 145c. By adopting this configuration, a vacuum in an interior space where motor rotor 120 is accommodated is maintained. At the same time, there is provided an advantage that an increase in temperature due to heat generated from the motor stator and conducted by the resin used can be reduced.

In addition, an attaching portion 143c is formed at an end face (a left end face in the figure) of an end portion of the resin molded portion 145c where the motor 100c is attached to the vacuum pump (whose illustration is omitted). This attaching portion 143c is a portion which is formed integrally as part of the resin molded portion 145c and is designed to be attached to a pump casing of the vacuum pump with bolts or the like, not shown. It is noted that the structure of the attaching portion 143c is described only as an example thereof, and hence, any configuration may be adopted, provided that it enables the motor 100c to be attached to the pump casing thereat.

[Lead Wires]

Figure 4:
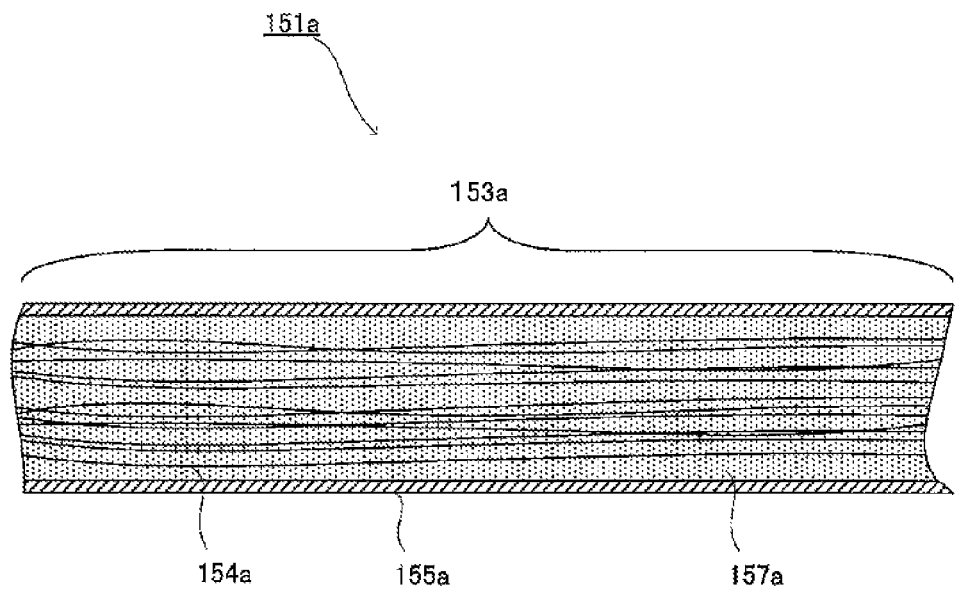
Figure 4:
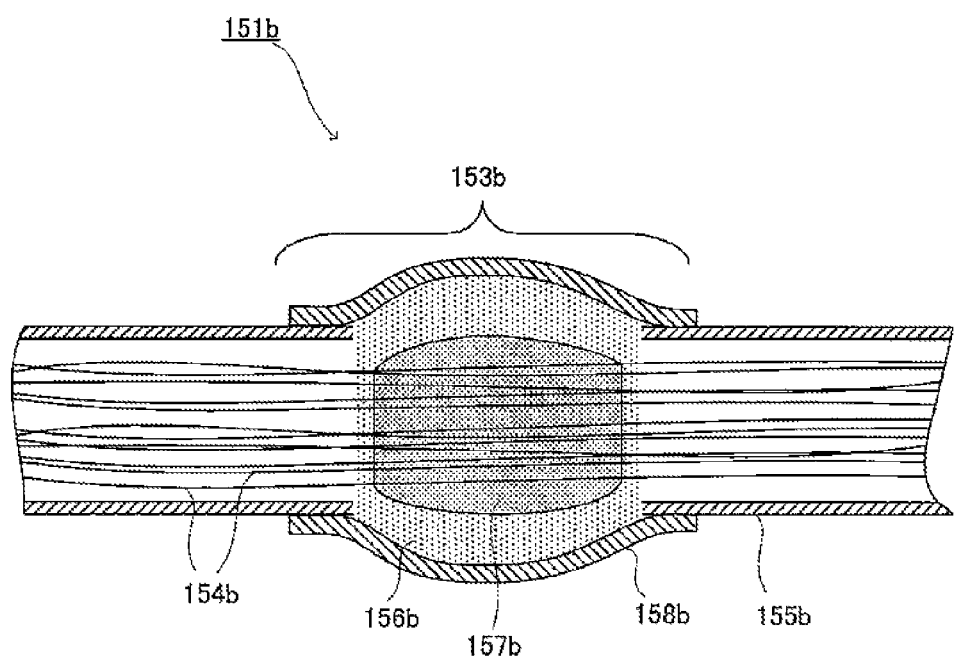

Next, based on FIG. 4, the structure of a seal portion 153a of a lead wire 151a will be described. The lead wire 151a includes a covering portion 155a and a core wire portion 154a. As shown in FIG. 4(A), the seal portion 153a of this embodiment is characterized in that at least part of the lead wire 151a is treated with a resin sealing. Namely, a resin 157a is impregnated in an interior of the covering portion 155a of the lead wire 151a, whereby an interior of the lead wire 151a is sealed. This makes the interior of the lead wire 151a impervious to air.

Next, a specific method of executing the resin sealing treatment will be described. Firstly, a lead wire is prepared which is cut at both end portions. As this occurs, it is desirable that a length of the lead wire is made equal to that of a final product. This is because when a lead wire which has been subjected to a resin sealing treatment is cut, for example, a crack is produced in the resin set, leading to a risk of a reduction in sealing properties of the seal portion 153a.

Next, the lead wire is accommodated in a vacuum chamber. An interior of this vacuum chamber is filled with a molten resin. Thereafter, a vacuum is drawn in the interior of the vacuum chamber. Then, air residing in the interior of the covering portion of the lead wire is sucked out, so that the resin 157a enters the interior of the lead wire 151a to replace the air. By controlling the time during which the vacuum is drawn, the whole length of the lead wire 151a can be sealed with the resin. Alternatively, only part of the lead wire 151a can be sealed with the resin. In addition, it is also considered to seal only one end portion side of the lead wire 151a with the resin by allowing the resin to enter only from one end portion of the lead wire 151a. By doing so, the handling of core wires at the other end portion of the lead wire to which the resin sealing treatment is not applied can be facilitated.

The interior of the vacuum chamber is heated after the resin 157a has entered the interior of the lead wire 151a. This is because the resin 157a used is a heat-hardening resin. After the lead wire 151a is heated in this way for a predetermined period of time, the lead wire 151a is left to stand to be cooled. Finally, the lead wire 151a is removed from the vacuum chamber, whereupon the resin sealing treatment is completed. In the interior of the resin sealed lead wire 151a, the resin 157a exists substantially along the full length of the lead wire 151a, and therefore, even in the event that part of the resin 157a is damaged by bending the lead wire 151a, the sealing properties are maintained at the other portions of the lead wire 151a. Because of this, the lead wire 151a is advantageous in being used under such circumstances that the lead wire 151a is bent or worked after the resin sealing treatment has been applied thereto. It is noted that the resin 157a used is not limited to heat-hardening resins, and hence, resins may be used which harden after being dried for a predetermined period of time without being heated. Additionally, by using resins which are kept flexible even after they harden, it is possible to provide a lead wire 151a which does not lose its sealing properties even though it is bent after the resin sealing treatment has been applied thereto.

Next, a seal portion 153b which seals a lead wire through soldering will be described based on FIG. 4(B). This seal portion 153b which seals a lead wire 151b by the use of a solder 157b is such that a sealing treatment is applied to a predetermined position of the lead wire 151b. A specific method of executing the sealing treatment using the solder 157b will be described below. Firstly, a covering portion 155b of the seal portion 153b of the lead wire 151b is removed, whereby a core wire portion 154b is exposed. The core wire portion 154b is formed by bundling thin core wires together into a single lead wire 151b. In this state, the solder 157b which is molten is poured over the core wire portion 154b, whereby part of the solder 157b enters between the core wires, while the remaining thereof stays on an outer circumferential portion of the core wire portion 154b. When the solder 157 is cooled to harden, the core wire portion 154b and the solder 157b become integral, that is, the core wires are formed into a single wire assembly, whereby an air passageway in the interior of the core wire portion 154b is closed.

Next, a sealing medium 156b is applied to a surface of the solder 157b at the seal portion 153b to a predetermined thickness. Here, a heat-resistant material such as a silicone caulking medium, for example, is used as the sealing medium 156. The caulking medium holds a predetermined fluidity immediately after outside air comes into contact therewith, and therefore, even though the shapes of the core wire portion 154b and the solder 157b are complex, the caulking medium can cover the core wire portion 154b and the solder 157b in an ensured fashion. Additionally, a heat-shrinkable tube 158b is placed over the seal portion 153b after the sealing medium 156b is applied. Thereafter, the heat-shrinkable tube 158b is heated to a predetermined temperature to thereby be shrunk, whereby an internal air passageway in the lead wire 151b is sealed up completely.

[Sealing Mechanism of Motor Frame]

Figure 5:
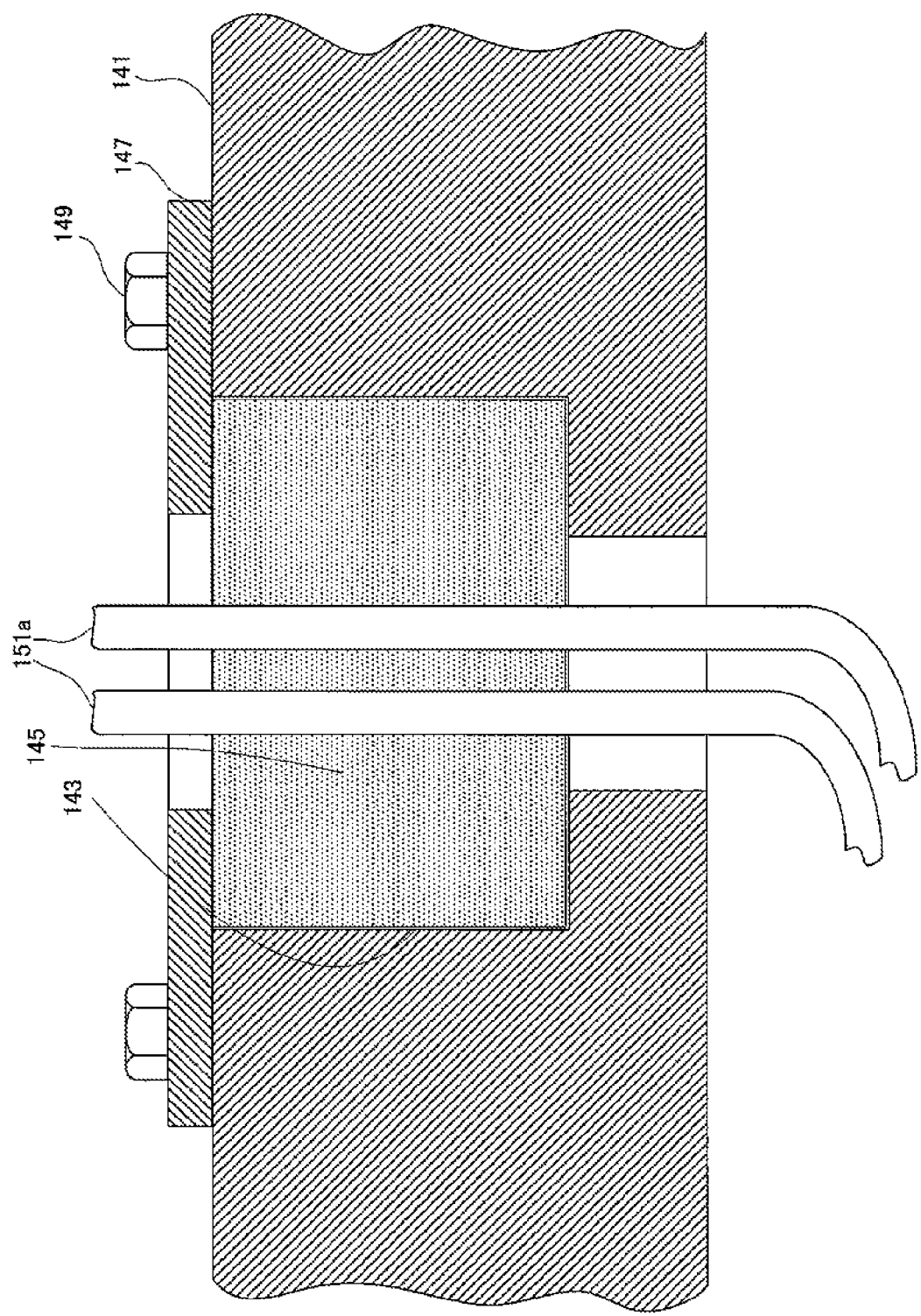
FIG. 5 is a sectional view showing a sealing structure in an opening portion in the motor frame.

Next, based on FIGS. 1 and 5, a sealing mechanism in the frame main body 141 of the motor frame 140 will be described. An opening portion 143 is formed in a predetermined position on the frame main body 141 of the motor frame 140. Then, the lead wire 151a is led into the frame main body 141 through this opening portion 143. The lead wire 151a is connected to the motor stator 110 (refer to FIG. 1) so as to supply electric power to the motor stator 110 as required. In this embodiment, as shown in FIG. 1, the opening portion 143 is formed in a position on the motor 100 which lies near a top right-hand side corner thereof. In addition, in this embodiment, two lead wires 151a are led into the frame main body 141 as an example. However, no specific limitation is imposed on the number of lead wires 151a.

The opening portion 143 is formed into a stepped opening, in which an upper sectional area of the opening portion 143 is larger than a lower sectional area thereof. Additionally, a seal member 145 is inserted in this opening portion 143. The seal member 145 is inserted in an upper area of the opening portion 143 and is prevented from dropping therefrom by a step formed in the opening portion. Although various materials can be used for the seal member 145 as long as they are gastight and flexible, in this embodiment, as an example, an elastic rubber or more specifically, a silicone rubber is used. Additionally, predetermined drilled holes (whose illustration is omitted) are formed in the seal member 145 so that the lead wires 151a are led into the frame main body 141 through the drilled holes.

In addition, a predetermined fastening plate 147 is in abutment with an upper portion of the seal member 145. A through hole is formed in this fastening plate 147, so that the lead wires 151a can be passed therethrough. Additionally, the fastening plate 147 is fixed to an upper surface of the frame main body 141 with bolts 149. In this case, an initial thickness of the seal member 145 is thicker than a depth of the stepped opening formed in the opening portion 143. This increases the sealing properties at interfaces between the frame main body 141 and the lead wires 151a due to the silicone rubber 145 being compressed as the fastening plate 147 is tightened by the bolts 149. However, in the event that required sealing properties can be obtained without compressing the seal member 145 at all, a seal member may be employed whose thickness is equal to or smaller than the depth of the stepped opening.

[Function]

Next, based on FIGS. 2 and 5, the function of the sealing structure according to this embodiment will be described. As has been described heretofore, FIG. 2(A) shows the motor 100 without a can. The pump main shaft 21 of the vacuum pump (denoted by reference numeral 20 in FIG. 1) is inserted into the interior of the motor 100, and the motor rotor 120 and the motor stator 110 are also under the vacuum (or partial vacuum) condition. In this case, in the event that a normal lead wire is used, air flows from an exterior environment into the interior of the motor 100 by way of an interior space of a covering portion of the lead wire. However, the lead wire 151a of this embodiment is sealed with the resin, and therefore, there is caused no such situation that air flows into the interior of the motor 100. In particular, when the lead wire 151a is resin sealed, the resin sealing treatment is applied to the lead wire 151a over a wide range along the longitudinal direction thereof. Therefore, even though the sealing properties are partially reduced, the overall sealing properties are maintained. Namely, the seal portion is basically formed along the full length of the lead wire 151a.

On the other hand, also at the opening portion 143 in the frame main body 141, the sealed condition is maintained by the seal member 145. Namely, the seal member 145 made of the silicone rubber maintains the sealing properties at the interfaces between the frame main body 141 and the lead wires 151a, and therefore, there is also caused no such situation that air flows into the interior of the motor 100 from the opening portion 143 in the frame main body 141.

Next, the function of the motor 100b with the can 130 will be described. The function of the motor 100b is basically the same as that of the motor 100 without a can. However, due to the provision of the can 130, a double sealing structure is realized. Namely, the can 130 disposed between the motor rotor 120 and the motor stator 110. This isolates the motor stator 110 from the vacuum (or partially vacuum) condition. With this structure adopted, the sealing properties are ensured by the can 130 at the same time as the internal sealing properties of the motor 100b are ensured by the seal member 145 in the frame main body 141. This structure obviates the necessity of an expensive hermetic terminal. In addition, even in case the can 130 is damaged, the vacuum condition is maintained by the motor frame 140. For example, in the semiconductor fabrication process, a momentary loss of vacuum (a momentary entry of air) causes a reaction between the process gas and air or leads to the leakage of the process gas to the outside of the motor 100. However, the possibility of the aforesaid vacuum loss can be reduced largely by the structure of this embodiment.

It is noted that the invention is described as the combination of the individual constituent elements in the embodiment. However, in the invention, as long as the sealing structure can be realized, the constituent elements can be combined in an arbitrary fashion, and resultant combinations of the constituent elements also fall within the scope of the invention. For example, although the invention is described as an invention which includes all the constituent elements A, B, C, when those skilled in the art to which the invention pertains consider that the invention still can be established only by a combination of A and B, the resultant combination still belongs to the scope of the invention.

The invention can be applied to the sealing treatment of the vacuum pump motor.

DESCRIPTION OF REFERENCE NUMERALS 20 vacuum pump; 21 pump main shaft; 30 pump rotor; 100 motor; 110 motor stator; 120 motor rotor; 143 opening portion; 145 seal member; 151a lead wire.

What is claimed is:

1. A sealing structure for a vacuum pump motor, comprising:
a lead wire which passes through an opening formed in a motor frame, wherein the lead wire is configured to be connected to a motor stator; and
a seal member which seals the opening, wherein
the lead wire comprises core wires and a covering which covers the core wires, wherein a seal is formed around at least part of the core wires inside the covering, and wherein
the seal comprises a sealing treatment in which part of the covering is removed to partially integrate intermediate portions of the core wires into a single wire assembly through soldering, the intermediate portions being any portions other than ends of the core wires, and wherein the seal is covered by a heat-shrinkable tube via a sealing medium.

2. The sealing structure according to claim 1, wherein the seal member is made of an elastic rubber, and wherein a drilled hole through which the lead wire is passed is formed in the seal member.

3. The sealing structure according to claim 2, wherein the elastic rubber is attached to the opening in the motor frame while being compressed by a fastening plate.

4. A vacuum pump motor with the sealing structure according to claim 1, comprising:
a motor rotor which is connected directly to a pump main shaft of a vacuum pump.

5. The vacuum pump motor according to claim 4, wherein a can which closes securely the motor rotor is provided between the motor stator and the motor rotor.

6. A vacuum pump, comprising the sealing structure according to claim 1.

7. A vacuum pump, comprising the vacuum pump motor according to claim 4.

* * * * *